US010265926B2

(12) United States Patent
Kondo et al.

(10) Patent No.: US 10,265,926 B2
(45) Date of Patent: Apr. 23, 2019

(54) HONEYCOMB STRUCTURE

(71) Applicant: NGK INSULATORS, LTD., Nagoya (JP)

(72) Inventors: Takahiro Kondo, Nagoya (JP); Yasushi Kato, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 248 days.

(21) Appl. No.: 15/045,597

(22) Filed: Feb. 17, 2016

(65) Prior Publication Data

US 2016/0243786 A1     Aug. 25, 2016

(30) Foreign Application Priority Data

Feb. 25, 2015   (JP) ................................. 2015-035780

(51) Int. Cl.
*B32B 3/12*      (2006.01)
*B01D 46/24*     (2006.01)

(52) U.S. Cl.
CPC ............ *B32B 3/12* (2013.01); *B01D 46/2455* (2013.01); *B01D 2046/2492* (2013.01)

(58) Field of Classification Search
None
See application file for complete search history.

(56) References Cited

U.S. PATENT DOCUMENTS 4,177,307 A * 12/1979 Torii ..................... F01N 3/2828
428/116
6,421,915 B1    7/2002 Ichikawa
7,803,447 B2 *  9/2010 Kondo ............... B01D 46/2422
428/118
2010/0242426 A1 * 9/2010 Ohara ................ B01D 46/2429
55/523

FOREIGN PATENT DOCUMENTS

| DE | 19921780 A1 | 11/1999 |
| EP | 1422390 A1  | 5/2004  |
| EP | 2236482 A2  | 10/2010 |
| JP | 11-270334 A1 | 10/1999 |

OTHER PUBLICATIONS

U.S. Appl. No. 15/045,574, filed Feb. 17, 2016, Kondo, et al.
German Examination Report (and translation provided by foreign counsel) from a corresponding German patent application (DE 10 2016 002 083.0) dated Feb. 19, 2019, 8 pages.

* cited by examiner

*Primary Examiner* — Humera N Sheikh
*Assistant Examiner* — Xiaobei Wang
(74) *Attorney, Agent, or Firm* — Burr & Brown, PLLC (57) ABSTRACT

A honeycomb structure includes a honeycomb body having a partition wall defining a plurality of cells that extend from an inflow-end face as one end face to an outflow-end face as the other end face, the honeycomb body having a circumferential shape at a cross section orthogonal to an extending direction of the cells that is a rectangular shape with four corners being chamfered and having a long diameter and a short diameter, wherein the plurality of cells are hexagon cells having a hexagonal shape at the cross section orthogonal to the extending direction of the cells, and the hexagon cells are configured so that a longest diagonal line of each hexagon cell and the long diameter L of the honeycomb body form an angle that is 0 to 6°.

3 Claims, 4 Drawing Sheets

HONEYCOMB STRUCTURE

The present application is an application based on JP2015-035780 filed on Feb. 25, 2015 with the Japan Patent Office, the entire contents of which are incorporated herein by reference.

BACKGROUND OF THE INVENTION

Field of the Invention

The present invention relates to honeycomb structures. More particularly the present invention relates to a honeycomb structure with improved thermal shock resistance.

Description of the Related Art

A honeycomb structure has been conventionally known, which serves as a filter to purify exhaust gas emitted from an internal combustion engine of an automobile or the like, and includes a partition wall defining cells as a through channel of the exhaust gas. This filter is to purify exhaust gas by removing harmful substance such as NOx or particulates in the exhaust gas.

For this honeycomb structure, the structure including hexagonal-shaped cells (hexagon cells) at the cross section orthogonal to the extending direction of the cells is known (e.g., see Patent Document 1). Such hexagon cells have catalyst uniformly loaded on the surface of the partition wall defining these hexagon cells, and therefore such cells have high purification performance compared with square cells, and as a result the use thereof has been expanded. Note here that square cells refer to cells having a square shape at the cross section orthogonal to the extending direction of the cells. Recently the use of the honeycomb structure including hexagon cells (hexagon cell honeycomb structure) has been expanded not only for three-way catalyst but also for catalyst to purify NOx. A study has been further conducted for such a hexagon cell honeycomb structure to achieve upsizing or to let it have various shapes (circumferential shapes at the cross section orthogonal to the cell extending direction).

SUMMARY OF THE INVENTION

A honeycomb structure described in Patent Document 1 has a circular circumferential shape at the cross section orthogonal to the cell extending direction. In the case of a circumferential shape that is not a circle (e.g., an ellipse), however, such a honeycomb structure has a problem that thermal shock resistance obtained is insufficient. That is to say, a study has been conducted for various (variant-shaped) circumferential shapes (the circumferential shapes at the cross section orthogonal to the cell extending direction) as stated above. When a hexagon cell honeycomb structure has a variant shape, the above problems occur. Especially in the case of a large honeycomb structure, such a problem easily occurs.

For these reasons, the development of a honeycomb structure with improved thermal shock resistance has been desired when the structure has a circumferential shape at the cross section orthogonal to the cell extending direction that is not a circle.

In view of such problems of the conventional techniques, the present invention aims to provide a honeycomb structure with improved thermal shock resistance.

The present invention provides a honeycomb structure as in the following.

According to a first aspect of the present invention, a honeycomb structure is provided, includes a honeycomb body having a partition wall defining a plurality of cells that extend from an inflow-end face as one end face to an outflow-end face as the other end face, the honeycomb body having a circumferential shape at a cross section orthogonal to an extending direction of the cells that is a rectangular shape with four corners being chamfered and having a long diameter and a short diameter, wherein the plurality of cells are hexagon cells having a hexagonal shape at the cross section orthogonal to the extending direction of the cells, and the hexagon cells are configured so that a longest diagonal line of each hexagon cell and the long diameter of the honeycomb body form an angle that is 0 to 6° (when there are a plurality of the longest diagonal lines, any one of the longest diagonal lines and the long diameter form an angle that is 0 to 6°).

According to a second aspect of the present invention, a honeycomb structure is provided, includes a honeycomb body having a partition wall defining a plurality of cells that extend from an inflow-end face as one end face to an outflow-end face as the other end face, the honeycomb body having a circumferential shape at a cross section orthogonal to an extending direction of the cells that is a trapezoidal shape with four corners being chamfered and having a long diameter and a short diameter, wherein the plurality of cells are hexagon cells having a hexagonal shape at the cross section orthogonal to the extending direction of the cells, and the hexagon cells are configured so that a longest diagonal line of each hexagon cell and the long diameter of the honeycomb body form an angle that is 0 to 6° (when there are a plurality of the longest diagonal lines, any one of the longest diagonal lines and the long diameter form an angle that is 0 to 6°).

According to a third aspect of the present invention, a honeycomb structure is provided, includes a honeycomb body having a partition wall defining a plurality of cells that extend from an inflow-end face as one end face to an outflow-end face as the other end face, the honeycomb body having a circumferential shape at a cross section orthogonal to an extending direction of the cells that is a triangle shape with three corners being chamfered and having a long diameter and a short diameter, wherein the plurality of cells are hexagon cells having a hexagonal shape at the cross section orthogonal to the extending direction of the cells, and the hexagon cells are configured so that a longest diagonal line of each hexagon cell and the long diameter of the honeycomb body form an angle that is 0 to 6° (when there are a plurality of the longest diagonal lines, any one of the longest diagonal lines and the long diameter form an angle that is 0 to 6°).

According to a fourth aspect of the present invention, the honeycomb structure according to any one of the first to third aspects is provided, wherein the hexagon cells are configured so that a longest diagonal line of each hexagon cell and the long diameter of the honeycomb body form an angle that is 1 to 6° (when there are a plurality of the longest diagonal lines, any one of the longest diagonal lines and the long diameter form an angle that is 1 to 6°).

In the honeycomb structure of the present invention, the hexagon cells are formed so that a longest diagonal line of each hexagon cell and the long diameter of the honeycomb body form an angle that is 0 to 6°. With this configuration, the honeycomb structure of the present invention can have improved thermal shock resistance.

DETAILED DESCRIPTION OF THE PRESENT INVENTION

The following describes embodiments of the present invention. The present invention is not limited to the following embodiments, and is to be understood to include the following embodiments, to which modifications and improvements are added as needed based on the ordinary knowledge of a person skilled in the art without departing from the scope of the present invention.

Figure 1:
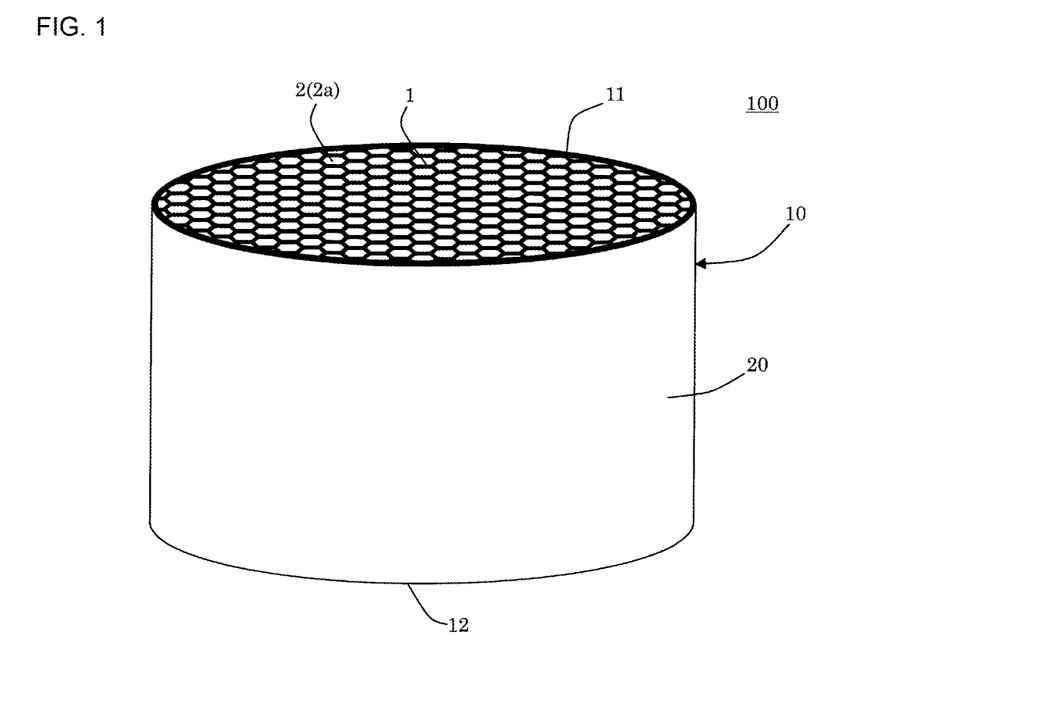
FIG. 1 is a perspective view schematically showing one embodiment of a honeycomb structure of the present invention.

[1] Honeycomb Structure (Chamfered Rectangular Shape):

One embodiment of a honeycomb structure of the present invention is a honeycomb structure 100 shown in FIG. 1. The honeycomb structure 100 includes a honeycomb body 10 having a partition wall 1 defining a plurality of cells 2 that extend from an inflow-end face 11 as one end face to an outflow-end face as the other end face. This honeycomb body 10 has a circumferential shape at the cross section orthogonal to the extending direction of the cells 2 that is a rectangular shape with four corners being chamfered and having the long diameter L and the short diameter S (see FIG. 2). Then, the plurality of cells 2 are hexagon cells 2*a* having a hexagonal shape at the cross section orthogonal to the extending direction of the cells 2. These hexagon cells 2*a* are formed so that the longest diagonal line D of each hexagon cell 2*a* and the long diameter L of the honeycomb body 10 form an angle θ (hereinafter this may be called "inclination angle") that is 0 to 6° (when there are a plurality of the longest diagonal lines, any one of the longest diagonal lines and the long diameter form an angle that is 0 to 6°) (see FIG. 3).

In such a honeycomb structure, their hexagon cells are formed so that the longest diagonal line of each hexagon cell and the long diameter of the honeycomb body form an angle that is 0 to 6°, and therefore the honeycomb structure has improved thermal shock resistance.

Figure 2:
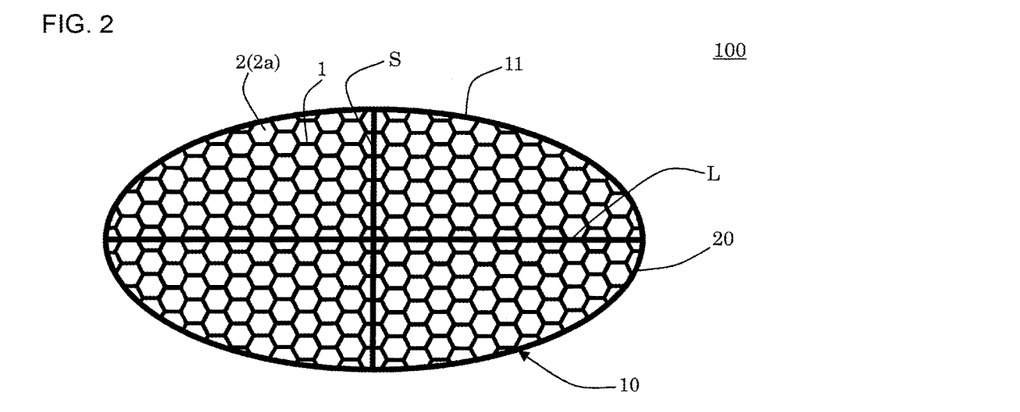
FIG. 2 schematically shows one embodiment of the honeycomb structure of the present invention viewed from one end face.
Figure 3:
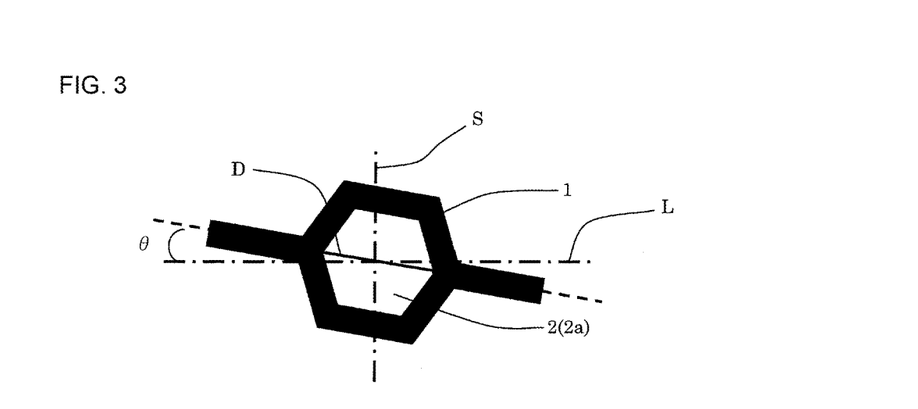
FIG. 3 is an enlarged view schematically showing a cell in one embodiment of the honeycomb structure of the present invention.

FIG. 1 is a perspective view schematically showing one embodiment of the honeycomb structure of the present invention. FIG. 2 schematically shows one embodiment of the honeycomb structure of the present invention viewed from one end face. FIG. 3 is an enlarged view schematically showing a cell in one embodiment of the honeycomb structure of the present invention.

Conventionally honeycomb structures having a plurality of hexagon cells and having the circumferential shape (circumferential shape at the cross section orthogonal to the cell extending direction) that is a circle has been put into practical use. Meanwhile the honeycomb structure including hexagon cells has become widely used not only for three-way catalyst but also for catalyst to purify NOx. The use of such a honeycomb structure including hexagon cells that is large in size or has various shapes (circumferential shapes at the cross section orthogonal to the cell extending direction) has been expanded. Therefore a honeycomb structure including hexagon cells that has the circumferential shape other than a circle (e.g., an ellipse) may be used in some cases.

Such a honeycomb structure including hexagon cells and having the circumferential shape that is not a circle (variant-shaped honeycomb structure), however, has a problem that the directionality is critical in a relationship between these hexagon cells and the circumferential shape of the honeycomb structure. That is, sufficient thermal shock resistance may not be obtained in some cases.

A honeycomb structure of the present invention is based on the finding that the directionality in a relationship between hexagon cells and the circumferential shape of the honeycomb structure is critical. Specifically the honeycomb structure of the present invention is configured so that their hexagon cells have an angle between the longest diagonal line of each hexagon cell and the long diameter of the honeycomb body that is 0 to 6°. With this configuration, the honeycomb structure of the present invention has improved thermal shock resistance.

Specifically when a variant-shaped honeycomb structure (this may be called a "honeycomb structure" simply) is heated and cooled under the practically operating conditions, thermal stress occurs in the honeycomb structure. Such thermal stress may cause the problem of cracks occurring in the variant-shaped honeycomb structure. To solve such a problem, the hexagon cells thereof are formed so as to have an angle between the longest diagonal line of each hexagon cell and the long diameter of the honeycomb body that is 0 to 6°. With this configuration, thermal stress occurring in the variant-shaped honeycomb structure reduces, and so thermal shock resistance is improved.

[1-1] Hexagon Cells:

The inclination angle is required to be 0 to 6° as stated above, where 1 to 6° is preferable and 1 to 4° is more preferable. That is, hexagon cells are formed preferably so that the angle between the longest diagonal line of each hexagon cell and the long diameter of the honeycomb body is 1 to 6°, and more preferably 1 to 4°. If the inclination angle exceeds the upper limit, sufficient thermal shock resistance cannot be obtained.

In the present invention, hexagon cells are not limited particularly as long as the shape at the cross section orthogonal to the cell extending direction is a hexagon, and they are regular hexagons preferably. When they are regular hexagons, the honeycomb structure has more improved thermal shock resistance.

In the present specification, the "longest diagonal line of each hexagon cell" refers to the longest diagonal line among a plurality of diagonal lines depicted in the hexagon cell.

For the honeycomb structure of the present invention, it is preferable that all of the hexagon cells satisfy the condition of the inclination angle as stated above.

[1-2] Honeycomb Body:

The "rectangular shape with four corners being chamfered and the short diameter" refers to a shape of a rectangle having a long side and a short side whose four corners are chamfered. Herein "corners being chamfered" refers to the corners of the rectangle that are cut out with a curved trail, and the size of the corners cut out is not limited. That is, a shape such as an elliptical shape or a race track shape corresponds to the "rectangular shape with four corners being chamfered and having the long diameter and the short diameter".

In the present embodiment, the "long diameter" refers to the longest straight line connecting two points on the circumferential edge of the honeycomb body at the cross section orthogonal to the cell extending direction. Then, the "short diameter" refers to the straight line that is orthogonal to the "long diameter" at the cross section orthogonal to the cell extending direction.

Figure 4:
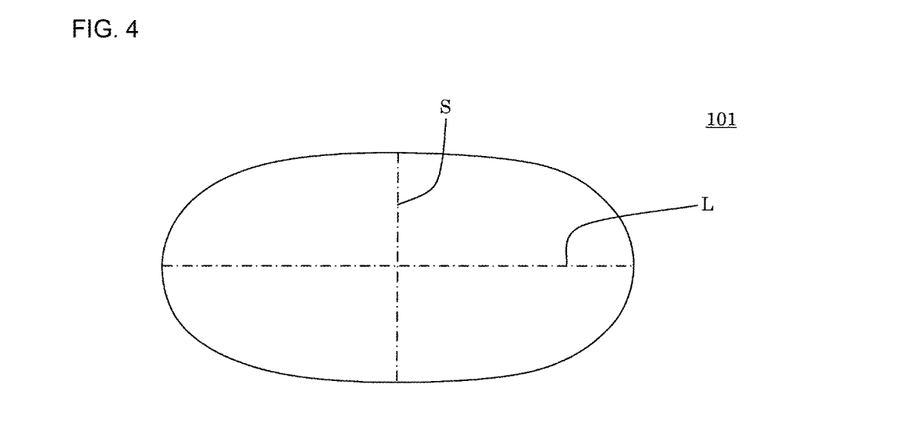
FIG. 4 schematically shows another embodiment of the honeycomb structure of the present invention viewed from one end face.
Figure 5:
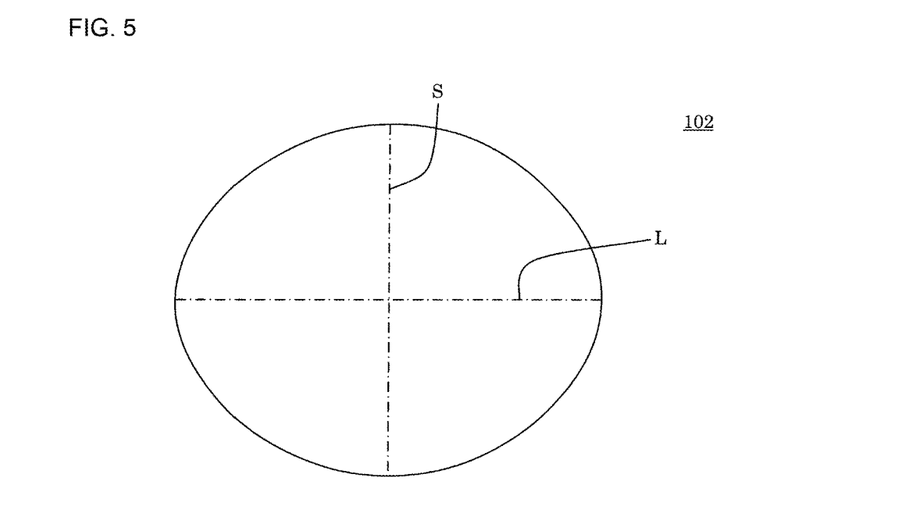
FIG. 5 schematically shows still another embodiment of the honeycomb structure of the present invention viewed from one end face.

FIG. 2 shows a honeycomb structure 100 in which the "rectangular shape with four corners being chamfered and having the long diameter and the short diameter" is an elliptical shape. FIG. 4 shows a honeycomb structure 101 as another example in which the "rectangular shape with four corners being chamfered and having the long diameter L and the short diameter S" is an elliptical shape. FIG. 5 shows a honeycomb structure 102 as still another example in which the "rectangular shape with four corners being chamfered and having the long diameter L and the short diameter S" is an elliptical shape.

Figure 6:
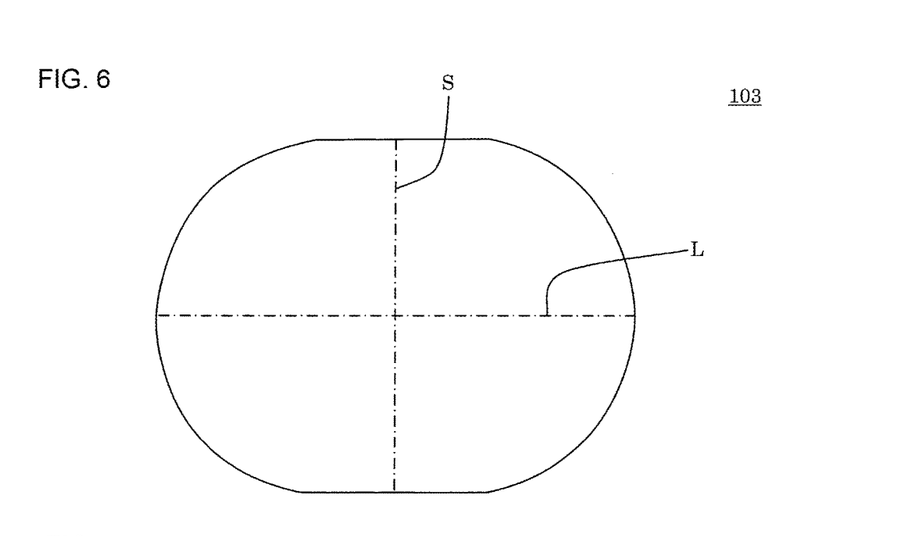
FIG. 6 schematically shows a further embodiment of the honeycomb structure of the present invention viewed from one end face.

FIG. 6 shows a honeycomb structure 103 in which the "rectangular shape with four corners being chamfered and having the long diameter L and the short diameter S" is a race track shape. The "race track shape" is a shape consisting of a pair of parallel straight lines and arc-like curved lines connecting these straight lines as shown in FIG. 6.

Figure 7:
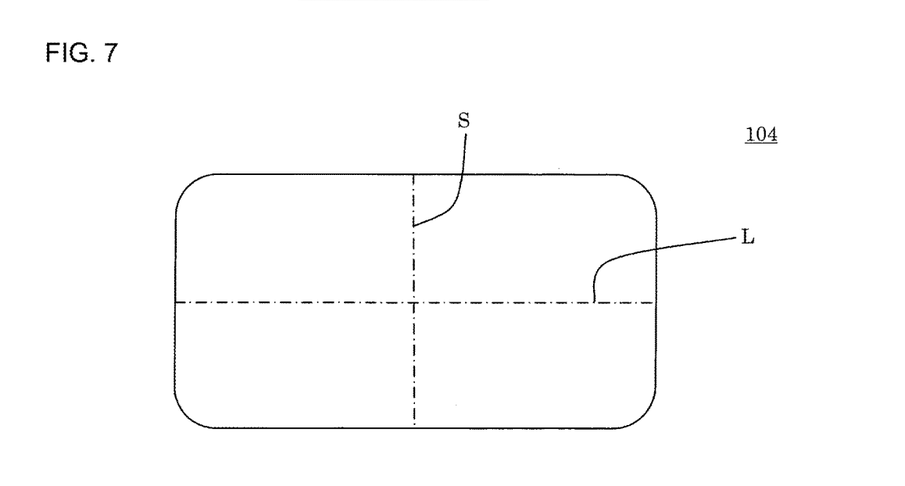
FIG. 7 schematically shows a still further embodiment of the honeycomb structure of the present invention viewed from one end face.

FIG. 7 shows a honeycomb structure 104 in which the "rectangular shape with four corners being chamfered and having the long diameter L and the short diameter S" is a TV screen shape. The "TV screen shape" is a shape such that the chamfered parts have a curvature radius that is smaller than that of the "race track shape".

Note here that cells and partition walls are omitted in FIGS. 4 to 7.

In the present embodiment, the value of ratio between the long diameter and the short diameter (long diameter/short diameter) is not limited particularly, and 1.02 to 3.0 is preferable and 1.1 to 2.2 is more preferable. A honeycomb structure satisfying such a condition can have improved thermal shock resistance.

The long diameter can be 50 to 360 mm specifically. The short diameter can be 40 to 355 mm specifically.

The partition wall of the honeycomb body is preferably made of a material including ceramic as a main component. Examples of the material for the partition wall include silicon carbide, silicon-silicon carbide based composite materials, cordierite, mullite, alumina, spinel, silicon carbide-cordierite based composite materials, lithium aluminum silicate, and aluminum titanate. Then the partition wall is preferably made of at least one type selected from the group consisting of these materials. Among them, cordierite is preferable. Note here that a "main component" refers to the component included in the materials making up the partition wall that accounts for 50 mass % or more.

The partition wall 1 of the honeycomb body 10 has a thickness that is 40 to 440 μm preferably, 45 to 310 μm more preferably, and 50 to 170 μm particularly preferably. If the thickness of the partition wall is less than the lower limit, the isostatic strength may deteriorate. On the contrary, if the thickness exceeds the upper limit, pressure loss may increase.

The thickness of the partition wall 1 of the honeycomb body 10 may be different between the central region and the circumferential region. The circumferential region refers to the range of the cross section orthogonal to the cell extending direction including the first cell through the tenth cell when the cells are counted from the circumferential face of the honeycomb structure toward the center. The central region is a region other than the circumferential region. In other words, this is a region inside of the circumferential region at the cross section orthogonal to the cell extending direction.

The partition wall in the central region has a thickness that is 40 to 440 μm preferably, 45 to 310 μm more preferably, and 50 to 170 μm particularly preferably. If the thickness of the partition wall is less than the lower limit, the isostatic strength may deteriorate. On the contrary, if the thickness exceeds the upper limit, pressure loss may increase.

The partition wall in the circumferential region has a thickness that is 45 to 440 μm preferably, 50 to 310 μm more preferably, and 55 to 170 μm particularly preferably. If the thickness of the partition wall is less than the lower limit, the isostatic strength may deteriorate. On the contrary, if the thickness exceeds the upper limit, pressure loss may increase.

The honeycomb body 10 has a cell density that is 15 to 240 pieces/$cm^2$ preferably, 30 to 200 pieces/$cm^2$ more preferably, and 45 to 140 pieces/$cm^2$ particularly preferably. If the cell density is less than the lower limit, the purification performance may deteriorate. On the contrary, if it exceeds the upper limit, pressure loss may increase.

The honeycomb body 10 may be a bonded member including a plurality of honeycomb segments. That is, the honeycomb body may include a collective form of a plurality of honeycomb segments and a bonding part made of a bonding material to bond these honeycomb segments mutually.

The length of the cell extending direction in the honeycomb structure can be 35 to 440 mm.

The honeycomb structure of the present invention may further include a circumferential wall 20 on the lateral face of the honeycomb body (see FIG. 2).

The honeycomb structure of the present invention may include a circumferential coating layer on the circumferential face of the honeycomb body. That is, the honeycomb structure of the present invention may include the honeycomb body and the circumferential wall that are formed integrally as stated above. Alternatively, the honeycomb structure of the present invention may be prepared by grinding the circumference of a honeycomb fired body described later to obtain a ground body, and then applying a circumferential coating material on the circumferential face of this ground body to form a circumferential coating layer.

Herein, when the circumference of the honeycomb fired body is ground, the honeycomb fired body with dimensional deformation, if any, may be shaped by grinding so as to match with the desired dimensions. That is, dimensional deformation may be corrected during the formation of a circumferential coating layer as a secondary effect. Recently, however, a large honeycomb structure may be used, and in the case of such a large honeycomb structure, an effect from just the grinding is not enough. That is, since a large honeycomb structure has increased weight compared with a typical honeycomb structure, the influences of dimensional deformation are large, and so the cells may be deformed. In this case, it is difficult to correct the dimensional deformation as a secondary effect as stated above, and it has to be ground greatly. Meanwhile such grinding greatly is not performed typically because of the cost or the like. Therefore a honeycomb structure with sufficient thermal shock resistance is hardly obtained through grinding during the process to form a circumferential coating layer. From this, even when the honeycomb structure has a circumferential coating layer, it is important to form hexagon cells satisfying the above condition to obtain the advantageous effects of the present invention.

A honeycomb structure 105 shown in FIG. 8 and a honeycomb structure 106 shown in FIG. 9 described later may include a circumferential coating layer on the circumferential face of the honeycomb body similarly to the honeycomb structure 100 of FIG. 1. Then, when the honeycomb structure 105 of FIG. 8 and the honeycomb structure 106 of FIG. 9 include the circumferential coating layer, it is important to form hexagon cells so as to satisfy the above condition for the reason similar to the above.

[2] Manufacturing Method of Honeycomb Structure (Chamfered Rectangular Shape):

Next the following describes a manufacturing method of the honeycomb structure of the present embodiment. Firstly a pillar-shaped honeycomb formed body is formed. This honeycomb formed body can be prepared by forming a forming raw material containing a ceramic raw material. The honeycomb formed body includes a partition wall (partition wall before firing) defining a plurality of cells serving as a through channel of fluid and a circumferential wall (circumferential wall before firing) located at the outermost circumference.

The ceramic raw material contained in the forming raw material is preferably at least one type selected from the following "raw material group". The "raw material group" is a "group consisting of silicon carbide, silicon-silicon carbide based composite materials, cordierite forming raw materials, cordierite, mullite, alumina, spinel, silicon carbide-cordierite based composite materials, lithium aluminum silicate, and aluminum titanate".

The forming raw material is preferably prepared by mixing pore former, binder, dispersing agent, surfactant, dispersing medium or the like with the ceramic raw material as stated above.

When a honeycomb formed body is formed using the forming raw material, it is preferable that the forming raw material firstly be kneaded to be a kneaded material, and the obtained kneaded material be formed to have a honeycomb shape.

A method for forming a honeycomb formed body by forming a kneaded material is not limited especially, which may be a forming method, such as extrusion, injection molding or press molding.

When the honeycomb formed body is formed, the "inclination angle" as stated above is set so as to satisfy the above condition (0 to 6°).

The honeycomb formed body is preferably extruded so that the long diameter L is parallel to the horizontal direction as in the honeycomb structure 100 of FIG. 2. This can suppress deformation of the honeycomb structure in the vertical direction. Then as a result, the dimensional accuracy of the obtained honeycomb structure can be improved. Then, the honeycomb formed body extruded is received by a base, and is transferred to the next step.

After forming the honeycomb formed body, the obtained honeycomb formed body is preferably dried under a conventionally known condition. Then, the obtained honeycomb formed body is preferably fired (main firing) to obtain a honeycomb structure. Note here that, before firing (main firing) the honeycomb formed body, it is preferable that the honeycomb formed body be calcinated.

The firing condition (temperature, time) during main firing varies with the types of the forming raw material, and therefore an appropriate condition may be selected depending on the type. For instance, when a cordierite forming raw material is used, the maximum firing temperature is preferably 1,410 to 1,440° C. The duration to keep (hold) the maximum firing temperature is preferably 3 to 15 hours.

The honeycomb structure of the present invention can be manufactured in this way. Note here that the manufacturing method of the honeycomb structure of the present invention is not limited to the manufacturing method as stated above.

Figure 8:
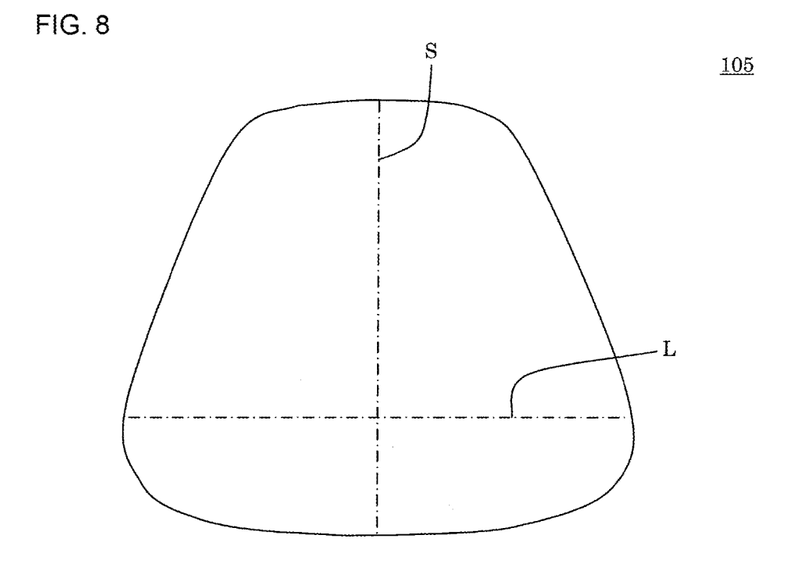
FIG. 8 schematically shows another embodiment of the honeycomb structure of the present invention viewed from one end face.

[3] Honeycomb Structure (Chamfered Trapezoidal Shape):

Another embodiment of the honeycomb structure of the present invention is the honeycomb structure 105 shown in FIG. 8. The honeycomb structure 105 includes a honeycomb body 10 having a partition wall defining a plurality of cells that extend from an inflow-end face 11 as one end face to an outflow-end face as the other end face. This honeycomb body 10 has a circumferential shape at the cross section orthogonal to the extending direction of the cells that is a trapezoidal shape with four corners being chamfered and having the long diameter L and the short diameter S. Then, the plurality of cells are hexagon cells having a hexagonal shape at the cross section orthogonal to the extending direction of the cells. These hexagon cells are formed so that the longest diagonal line of each hexagon cell and the long diameter L of the honeycomb body 10 form an angle (inclination angle) that is 0 to 6° (when there are a plurality of the longest diagonal lines, any one of the longest diagonal lines and the long diameter form an angle that is 0 to 6°).

In such a honeycomb structure, their hexagon cells are formed so that the longest diagonal line of each hexagon cell and the long diameter of the honeycomb body form an angle that is 0 to 6°, and therefore the honeycomb structure has improved thermal shock resistance.

FIG. 8 schematically shows the other embodiment of the honeycomb structure of the present invention viewed from one end face.

The honeycomb structure of the present embodiment has the circumferential shape of the honeycomb body that is a "trapezoidal shape with four corners being chamfered and having the long diameter and the short diameter" instead of "a rectangular shape with four corners being chamfered and having the long diameter and the short diameter" in the honeycomb structure 100 that is the one embodiment as stated above.

[3-1] Hexagon Cells:

The inclination angle is required to be 0 to 6° as stated above, where 1 to 6° is preferable and 1 to 4° is more preferable. That is, hexagon cells are formed preferably so that the angle between the longest diagonal line of each hexagon cell and the long diameter of the honeycomb body is 1 to 6°, and more preferably 1 to 4°. If the inclination angle exceeds the upper limit, sufficient thermal shock resistance cannot be obtained.

[3-2] Honeycomb Body:

The "trapezoidal shape with four corners being chamfered and having the long diameter and the short diameter" refers to a shape of a trapezoid having a long side (lower base) and a short side (upper base) whose four corners are chamfered. Herein "corners being chamfered" refers to the corners of the trapezoid that are cut out with a curved trail, and the size of the corners cut out is not limited.

In the present embodiment, the "long diameter" refers to, when the trapezoid at the cross section orthogonal to the cell extending direction is divided into a part on the upper base side and a part on the lower base side with the midpoint between the upper base and the lower base, the straight line that is parallel to the lower base and is the longest in the lower-base side part. In other words, when the honeycomb structure of the present embodiment is placed on a horizontal plane while placing the long side downward (see FIG. 8), this is the straight line that is parallel to the plane and is the longest among the straight lines connecting two points on the circumferential edge of the honeycomb body at the cross section orthogonal to the cell extending direction. Then, the "short diameter" refers to the straight line that is orthogonal to the "long diameter" at the cross section orthogonal to the cell extending direction. Note here that although the long diameter and the short diameter may have the same length in the present embodiment, the "long diameter" and the "short diameter" in the present embodiment are specified as stated above.

The trapezoid is not limited especially, which can be an isosceles trapezoid.

In the present embodiment, the value of ratio between the long diameter and the short diameter (long diameter/short diameter) is not limited particularly, and 1.02 to 3.0 is preferable and 1.1 to 2.2 is more preferable. A honeycomb structure satisfying such a condition can have more improved thermal shock resistance.

The long diameter can be 50 to 360 mm specifically. The short diameter can be 40 to 355 mm specifically.

For the other conditions of the honeycomb structure of the present embodiment, the same conditions of the honeycomb structure as the one embodiment as described above may be used.

[4] Manufacturing Method of Honeycomb Structure (Chamfered Trapezoidal Shape):

The honeycomb structure of the present embodiment can be manufactured similarly to the honeycomb structure as the one embodiment as described above.

Herein when the honeycomb formed body is formed, the "inclination angle" as stated above is set so as to satisfy the above condition (0 to 6°).

Then, the honeycomb formed body is preferably extruded so that the long side (lower base) is placed downward to the extending direction of the cells as shown in FIG. 8. This can suppress deformation of the honeycomb structure in the vertical direction. Then as a result, the dimensional accuracy of the obtained honeycomb structure can be improved.

Figure 9:
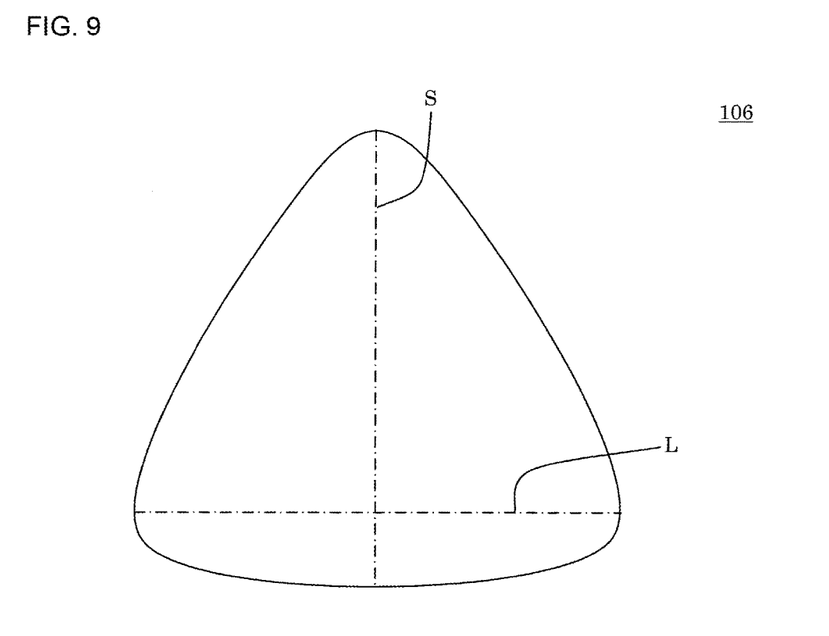
FIG. 9 schematically shows still another embodiment of the honeycomb structure of the present invention viewed from one end face.

[5] Honeycomb Structure (Chamfered Triangle Shape):

Still another embodiment of the honeycomb structure of the present invention is the honeycomb structure 106 shown in FIG. 9. The honeycomb structure 106 includes a honeycomb body 10 having a partition wall defining a plurality of cells that extend from an inflow-end face 11 as one end face to an outflow-end face as the other end face. This honeycomb body 10 has a circumferential shape at the cross section orthogonal to the extending direction of the cells that is a triangle shape with three corners being chamfered and having the long diameter L and the short diameter S. Then, the plurality of cells are hexagon cells having a hexagonal shape at the cross section orthogonal to the extending direction of the cells. These hexagon cells are formed so that the longest diagonal line of each hexagon cell and the long diameter L of the honeycomb body 10 form an angle (inclination angle) that is 0 to 6° (when there are a plurality of the longest diagonal lines, any one of the longest diagonal lines and the long diameter form an angle that is 0 to 6°).

In such a honeycomb structure, their hexagon cells are formed so that the longest diagonal line of each hexagon cell and the long diameter of the honeycomb body form an angle that is 0 to 6°, and therefore the honeycomb structure has improved thermal shock resistance.

FIG. 9 schematically shows the still other embodiment of the honeycomb structure of the present invention viewed from one end face.

The honeycomb structure of the present embodiment has the circumferential shape of the honeycomb body that is a "triangle shape with three corners being chamfered and having the long diameter and the short diameter" instead of "a rectangular shape with four corners being chamfered and having the long diameter and the short diameter" in the honeycomb structure 100 that is the one embodiment as stated above.

[5-1] Hexagon Cells:

The inclination angle is required to be 0 to 6° as stated above, where 1 to 6° is preferable and 1 to 4° is more preferable. That is, hexagon cells are formed preferably so that the angle between the longest diagonal line of each hexagon cell and the long diameter of the honeycomb body is 1 to 6°, and more preferably 1 to 4°. If the inclination angle exceeds the upper limit, sufficient thermal shock resistance cannot be obtained.

[5-2] Honeycomb Body:

The "triangle shape with three corners being chamfered and having the long diameter and the short diameter" refers to a shape of a triangle whose three corners are chamfered. Herein "corners being chamfered" refers to the corners of the triangle that are cut out with a curved trail, and the size of the corners cut out is not limited.

In the present embodiment, the "long diameter" refers to the straight line specified when the honeycomb structure of the present embodiment is placed on a horizontal plane so as to satisfy the following relationship. That is, at the cross section orthogonal to the cell extending direction, the honeycomb structure is placed on the plane so that one apex farthest from the plane is located at a middle part of the two other apexes (see FIG. 9). Then, in this state, the "long diameter" is the straight line that is parallel to the plane and is the longest among the straight lines connecting two points on the circumferential edge of the honeycomb body. Then, the "short diameter" refers to the straight line that is orthogonal to the "long diameter" at the cross section orthogonal to the cell extending direction. Note here that although the long diameter and the short diameter may have the same length in the present embodiment, the "long diameter" and the "short diameter" in the present embodiment are specified as stated above.

The triangle is not limited especially, which can be a regular triangle.

In the present embodiment, the value of ratio between the long diameter and the short diameter (long diameter/short diameter) is not limited particularly, and 1.02 to 3.0 is preferable and 1.1 to 2.2 is more preferable. A honeycomb structure satisfying such a condition can have more improved thermal shock resistance.

The long diameter can be 50 to 360 mm specifically. The short diameter can be 40 to 355 mm specifically.

For the other conditions of the honeycomb structure of the present embodiment, the same conditions of the honeycomb structure as the one embodiment as described above may be used.

[6] Manufacturing Method of Honeycomb Structure (Chamfered Triangle Shape):

The honeycomb structure of the present embodiment can be manufactured similarly to the honeycomb structure as the one embodiment as described above.

Herein when the honeycomb formed body is formed, the "inclination angle" as stated above is set so as to satisfy the above condition (0 to 6°).

Then, the honeycomb formed body is preferably extruded while placing one side downward to the extending direction of the cells so that the long diameter L is horizontal as shown in FIG. 9. This can suppress deformation of the honeycomb structure in the vertical direction. Then as a result, the dimensional accuracy of the obtained honeycomb structure can be improved.

EXAMPLES

The following describes the present invention in more details by way of examples, and the present invention is not limited to the following examples.

Example 1

Firstly, a kneaded material to form a honeycomb formed body was prepared using a forming raw material containing a ceramic raw material. A cordierite forming raw material was used as the ceramic raw material. Dispersing medium, organic binder, dispersing agent, and pore former were added to the cordierite forming raw material to prepare a kneaded material for forming. The amount of the dispersing medium added was 33 parts by mass with reference to 100 parts by mass of the cordierite forming raw material. The amount of the organic binder added was 5.6 parts by mass with reference to 100 parts by mass of the cordierite forming raw material. The amount of the pore former added was 0.5 part by mass with reference to 100 parts by mass of the cordierite forming raw material. The obtained ceramic forming raw material was kneaded using a kneader, whereby a kneaded material was obtained.

Next, the obtained kneaded material was extruded using a vacuum extruder, whereby a honeycomb formed body was obtained. A die used was to form the obtained honeycomb structure in which the cell cross-sectional shape was a hexagon, and the circumferential shape at the cross section orthogonal to the cell extending direction was an ellipse.

Next the obtained honeycomb formed body wad heated and dried by high-frequency induction heating, followed by drying at 120° C. for 2 hours by a hot-air drier. Thereafter the resultant was fired at 1,350 to 1,440° C. for 10 hours, whereby a honeycomb structure was obtained.

Table 1 shows "cell density (pieces/cm$^2$)", "thickness of partition wall in central region (μm)", "thickness of partition wall in circumferential region (μm)", "porosity (%)", "cell shape", "cross-section shape", "long diameter", "short diameter", "overall length" and "cell angle" in the obtained honeycomb structures. Herein, "thickness of partition wall in circumferential region" indicates the average of thicknesses of the partition wall existing in the range from the first cell to the tenth cell (circumferential region) when the cells were counted from the circumferential face of the honeycomb structure toward the center at the cross section orthogonal to the cell extending direction. Specifically a plurality of thicknesses of the partition wall in the circumferential region were measured at random, and the average thereof was used as the "thickness of partition wall in circumferential region". "Thickness of partition wall in central region" was the average of thicknesses of the partition wall existing in the range other than the circumferential region (central region). Specifically, a plurality of thicknesses of the partition wall in the central region were measured at random, and the average thereof was used as the "thickness of partition wall in central region". "Cell shape" was the shape of cells at the cross section orthogonal to the cell extending direction. "Cross-section shape" was the circumferential shape of the honeycomb structure at the cross section orthogonal to the cell extending direction. "Long diameter" was the long diameter of the honeycomb structure at the cross section orthogonal to the cell extending direction. "Short diameter" was the short diameter of the honeycomb structure at the cross section orthogonal to the cell extending direction. "Overall length" was the length of the honeycomb structure in the cell extending direction. "Cell angle" was the angle formed between the longest diagonal line of a cell and the long diameter of the honeycomb structure.

TABLE 1

| | | Cell structure | | | | | | | | | | Thermal shock resistance (burner test) |
|---|---|---|---|---|---|---|---|---|---|---|---|---|
| | Carrier type | Cell density (pieces/cm$^2$) | Partition wall thickness in central region (μm) | Partition wall thickness in circumferential region (μm) | Porosity (%) | Cell shape | Cross-section shape | Long diameter (mm) | Short diameter (mm) | Overall length (mm) | Cell angle (°) | |
| Ex. 1 | honeycomb carrier | 139.5 | 65 | 75 | 27 | hexagon | ellipse | 169.7 | 80.8 | 120.0 | 3 | A |
| Ex. 2 | honeycomb carrier | 139.5 | 64 | 64 | 27 | hexagon | ellipse | 127.0 | 63.5 | 100.0 | 5 | A |
| Ex. 3 | honeycomb carrier | 139.5 | 63 | 74 | 27 | hexagon | ellipse | 169.7 | 80.8 | 120.0 | 0 | B |
| Ex. 4 | honeycomb carrier | 139.5 | 64 | 64 | 27 | hexagon | ellipse | 125.0 | 80.0 | 120.0 | 6 | A |
| Ex. 5 | honeycomb carrier | 116.3 | 66 | 66 | 35 | hexagon | ellipse | 146.8 | 77.0 | 114.3 | 4 | A |
| Ex. 6 | honeycomb carrier | 116.3 | 62 | 62 | 35 | hexagon | ellipse | 146.8 | 77.0 | 91.0 | 0 | B |
| Ex. 7 | honeycomb carrier | 93.0 | 64 | 76 | 27 | hexagon | ellipse | 147.0 | 95.0 | 82.5 | 3 | A |
| Ex. 8 | honeycomb carrier | 93.0 | 64 | 75 | 35 | hexagon | ellipse | 185.0 | 90.0 | 114.3 | 1 | A |
| Ex. 9 | honeycomb carrier | 62.0 | 115 | 125 | 35 | hexagon | ellipse | 220.0 | 98.4 | 100.0 | 2 | A |

TABLE 1-continued

| | | Cell structure | | | | | | | | | Thermal shock |
|---|---|---|---|---|---|---|---|---|---|---|---|
| | Carrier type | Cell density (pieces/cm²) | Partition wall thickness in central region (μm) | Partition wall thickness in circumferential region (μm) | Porosity (%) | Cell shape | Cross-section shape | Long diameter (mm) | Short diameter (mm) | Overall length (mm) | Cell angle (°) | resistance (burner test) |
| Ex. 10 | honeycomb carrier | 62.0 | 113 | 124 | 35 | hexagon | ellipse | 228.6 | 137.2 | 152.4 | 1 | A |
| Ex. 11 | honeycomb carrier | 93.0 | 90 | 90 | 35 | hexagon | ellipse | 112.0 | 100.0 | 130.0 | 2 | A |
| Ex. 12 | honeycomb carrier | 139.5 | 65 | 65 | 27 | hexagon | ellipse | 104.0 | 84.0 | 150.0 | 0 | B |
| Ex. 13 | honeycomb carrier | 62.0 | 165 | 165 | 35 | hexagon | ellipse | 95.0 | 70.0 | 125.0 | 2 | A |
| Ex. 14 | honeycomb carrier | 93.0 | 88 | 88 | 35 | hexagon | trapezoid | 122.0 | 104.4 | 95.0 | 3 | A |
| Ex. 15 | honeycomb carrier | 93.0 | 89 | 89 | 35 | hexagon | ellipse | 107.0 | 105.0 | 114.3 | 1 | A |
| Ex. 16 | honeycomb carrier | 62.0 | 115 | 115 | 35 | hexagon | triangle | 109.4 | 87.5 | 114.3 | 2 | A |
| Ex. 17 | honeycomb carrier | 62.0 | 170 | 170 | 35 | hexagon | rectangle | 115.0 | 95.0 | 70.0 | 3 | A |
| Ex. 18 | honeycomb filter | 46.5 | 305 | 305 | 50 | hexagon | ellipse | 147.0 | 95.0 | 120.0 | 1 | A |

In Tables 1 and 2, the field of "carrier type" describes the structure of the honeycomb structure. "Honeycomb carrier" in this field means the structure of letting exhaust gas flow in the through cells (so-called a wall through type honeycomb structure). "Honeycomb filter" means the structure including a plugging portion, and letting exhaust gas flow through the partition wall (so-called a wall flow type honeycomb structure). In Table 2, "long diameter/diameter" was the long diameter or the diameter of the honeycomb structure at the cross section orthogonal to the cell extending direction. Herein the "diameter" means the diameter of the circle when the honeycomb structure has a circular circumferential shape at the cross section orthogonal to the cell extending direction.

For the obtained honeycomb structures, the following "thermal shock resistance" was evaluated. Table 1 shows the evaluation result.

[Thermal Shock Resistance]

Thermal shock resistance of a honeycomb structure was evaluated using a "propane gas torch" that was capable of supplying heating gas to a can body containing the honeycomb structure. Specifically, a honeycomb structure was put (canning) in a can body, which was set at the propane gas torch as stated above. Next, combustion gas was allowed to flow through the honeycomb structure. The combustion gas was allowed to flow at the flow rate of 50 NL/min. for 10 minutes, so that the gas temperature at a central part of the 10 mm-forward position of the honeycomb structure reached 1,100° C. in 10 minutes. Then, the combustion gas was stopped, and cooling air was allowed to flow instead at the flow rate of 250 NL/min. for 10 minutes, so that the gas temperature at a central part of the 10 mm-forward position of the honeycomb structure reached 100° C. in 10 minutes. Such flow of the combustion gas and the cooling air was set at one cycle, and this was conducted 20 cycles. Thereafter, the presence or absence of cracks was observed visually. In this way, the test for thermal shock resistance was conducted. Then, evaluations were made using the following criteria.

When no cracks were observed, this is described as "A", when cracks were found in only one cell, this is described as "B", and when cracks were found continuously across two or more cells, this is described as "C". Herein, "only one cell" means that the crack occurred in one cell at one position. "Continuously across two or more cells" means that cracks occurred continuously at cells of two positions or more.

Examples 2 to 18, Comparative Examples 1 to 13, Reference Examples 1 to 5

Honeycomb structures were manufactured similarly to Example 1 other than that they were changed as shown in Tables 1 and 2. For the manufactured honeycomb structures, the "thermal shock resistance" was evaluated. Tables 1 and 2 show the evaluation result.

Herein, Reference Examples 1 to 5 show the case where these honeycomb structures had a circular circumferential shape. As is found from these Reference Examples, when the honeycomb structures had a circular circumferential shape, the directionality in a relationship between hexagon cells and the circumferential shape of the honeycomb structure is not critical. On the contrary, in the case of a variant-shaped honeycomb structure, the above-stated problem of insufficient thermal shock resistance occurs.

TABLE 2

| | | Cell structure | | | | |
|---|---|---|---|---|---|---|
| | Carrier type | Cell density (pieces/cm$^2$) | Partition wall thickness in central region (μm) | Partition wall thickness in circumferential region (μm) | Porosity (%) | Cell shape |
| Comp. Ex. 1 | honeycomb carrier | 116.3 | 64 | 64 | 27 | hexagon |
| Comp. Ex. 2 | honeycomb carrier | 139.5 | 63 | 75 | 35 | hexagon |
| Comp. Ex. 3 | honeycomb carrier | 139.5 | 65 | 65 | 35 | hexagon |
| Comp. Ex. 4 | honeycomb carrier | 93.0 | 64 | 77 | 35 | hexagon |
| Comp. Ex. 5 | honeycomb carrier | 93.0 | 90 | 90 | 35 | hexagon |
| Comp. Ex. 6 | honeycomb carrier | 62.0 | 115 | 115 | 35 | hexagon |
| Comp. Ex. 7 | honeycomb carrier | 139.5 | 64 | 64 | 27 | hexagon |
| Comp. Ex. 8 | honeycomb carrier | 62.0 | 165 | 165 | 35 | hexagon |
| Comp. Ex. 9 | honeycomb carrier | 62.0 | 170 | 170 | 35 | hexagon |
| Comp. Ex. 10 | honeycomb carrier | 93.0 | 89 | 89 | 35 | hexagon |
| Comp. Ex. 11 | honeycomb carrier | 62.0 | 115 | 115 | 35 | hexagon |
| Comp. Ex. 12 | honeycomb carrier | 62.0 | 170 | 170 | 35 | hexagon |
| Comp. Ex. 13 | honeycomb filter | 46.5 | 300 | 300 | 50 | hexagon |
| Ref. Ex. 1 | honeycomb carrier | 139.5 | 65 | 75 | 27 | square |
| Ref. Ex. 2 | honeycomb carrier | 93.0 | 90 | 90 | 35 | square |
| Ref. Ex. 3 | honeycomb carrier | 139.5 | 63 | 63 | 27 | hexagon |
| Ref. Ex. 4 | honeycomb carrier | 93.0 | 64 | 74 | 27 | hexagon |
| Ref. Ex. 5 | honeycomb filter | 46.5 | 305 | 305 | 50 | hexagon |

| | Cross-section shape | Long diameter/ Diameter (mm) | Short diameter (mm) | Overall length (mm) | Cell angle (°) | Thermal shock resistance (Burner test) |
|---|---|---|---|---|---|---|
| Comp. Ex. 1 | ellipse | 147.0 | 95.0 | 82.5 | 10 | C |
| Comp. Ex. 2 | ellipse | 169.7 | 80.8 | 120.0 | 8 | C |
| Comp. Ex. 3 | ellipse | 146.8 | 77.0 | 114.3 | 7 | C |
| Comp. Ex. 4 | ellipse | 185.0 | 90.0 | 114.3 | 8 | C |
| Comp. Ex. 5 | ellipse | 112.0 | 100.0 | 130.0 | 7 | C |
| Comp. Ex. 6 | ellipse | 95.0 | 70.0 | 125.0 | 12 | C |
| Comp. Ex. 7 | ellipse | 104.0 | 84.0 | 125.0 | 8 | C |
| Comp. Ex. 8 | ellipse | 95.0 | 70.0 | 125.0 | 10 | C |
| Comp. Ex. 9 | trapezoid | 122.0 | 104.4 | 95.0 | 10 | C |
| Comp. Ex. 10 | ellipse | 107.0 | 105.0 | 114.3 | 10 | C |
| Comp. Ex. 11 | triangle | 109.4 | 87.5 | 114.3 | 10 | C |
| Comp. Ex. 12 | rectangle | 115.0 | 95.0 | 70.0 | 8 | C |
| Comp. Ex. 13 | ellipse | 147.0 | 95.0 | 120.0 | 8 | C |
| Ref. Ex. 1 | ellipse | 169.7 | 80.8 | 120.0 | 3 | B |
| Ref. Ex. 2 | ellipse | 147.0 | 95.0 | 152.4 | 8 | B |
| Ref. Ex. 3 | circle | 118.4 | — | 120.0 | 3 | B |
| Ref. Ex. 4 | circle | 143.8 | — | 100.0 | 8 | B |
| Ref. Ex. 5 | circle | 143.8 | — | 120.0 | 3 | B |

It can be found from Tables 1 and 2, that the honeycomb structures of Examples 1 to 18 had improved thermal shock resistance as compared with the honeycomb structures of Comparative Examples 1 to 13.

The honeycomb structure of the present invention can be used as a filter to purify exhaust gas emitted from an internal combustion engine of an automobile or the like.

DESCRIPTION OF REFERENCE NUMERALS

1: partition wall
2: cell
2*a*: hexagon cell
10: honeycomb body
11: inflow-end face
20: circumferential wall
100, 101, 102, 103, 104, 105, 106: honeycomb structure
D: diagonal line
L: long diameter
S: short diameter

What is claimed is:

1. A honeycomb structure, comprising:
a honeycomb body having partition walls defining a plurality of cells that extend from an inflow-end face as one end face to an outflow-end face as the other end face, the honeycomb body having a circumferential shape at a cross section orthogonal to the extending direction of the cells that is a rectangular shape with four corners being chamfered and having a long diameter and a short diameter, wherein
the plurality of cells are hexagon cells having a hexagonal shape at the cross section orthogonal to the extending direction of the cells, and
the hexagon cells are configured so that a longest diagonal line of each hexagon cell and the long diameter of the honeycomb body form an angle that is in a range from 1 to 6°, and when there are a plurality of the longest diagonal lines, any one of the longest diagonal lines and the long diameter form an angle that is in the range from 1 to 6°.

2. A honeycomb structure, comprising:
a honeycomb body having partition walls defining a plurality of cells that extend from an inflow-end face as one end face to an outflow-end face as the other end face, the honeycomb body having a circumferential shape at a cross section orthogonal to the extending direction of the cells that is a trapezoidal shape with four corners being chamfered and having a long diameter and a short diameter, wherein
the plurality of cells are hexagon cells having a hexagonal shape at the cross section orthogonal to the extending direction of the cells, and
the hexagon cells are configured so that a longest diagonal line of each hexagon cell and the long diameter of the honeycomb body form an angle that is in a range from 1 to 6°, and when there are a plurality of the longest diagonal lines, any one of the longest diagonal lines and the long diameter form an angle that is in the range from 1 to 6°.

3. A honeycomb structure, comprising:
a honeycomb body having partition walls defining a plurality of cells that extend from an inflow-end face as one end face to an outflow-end face as the other end face, the honeycomb body having a circumferential shape at a cross section orthogonal to the extending direction of the cells that is a triangle shape with three corners being chamfered and having a long diameter and a short diameter, wherein
the plurality of cells are hexagon cells having a hexagonal shape at the cross section orthogonal to the extending direction of the cells, and
the hexagon cells are configured so that a longest diagonal line of each hexagon cell and the long diameter of the honeycomb body form an angle that is in a range from 1 to 6°, and when there are a plurality of the longest diagonal lines, any one of the longest diagonal lines and the long diameter form an angle that is in the range from 1 to 6°.

* * * * *